(12) United States Patent
Bellamy et al.

(10) Patent No.: US 6,970,931 B1
(45) Date of Patent: Nov. 29, 2005

(54) METHOD FOR TRANSLUCENT ONLINE INTERACTION

(75) Inventors: Rachel K. E. Bellamy, Bedford, NY (US); Jason B. Ellis, Atlanta, GA (US); Thomas D. Erickson, Minneapolis, MN (US); Wendy A. Kellogg, Yorktown Heights, NY (US); Mark R. Laff, Mount Kisco, NY (US); Peter K. Malkin, Arsdley, NY (US); John T. Richards, Chappaqua, NY (US); Philip S. Yu, Chappaqua, NY (US); Tracee Wolf, Irvington, NY (US)

(73) Assignee: International Business Machines Corporation, Armonk, NY (US)

( * ) Notice: Subject to any disclaimer, the term of this patent is extended or adjusted under 35 U.S.C. 154(b) by 597 days.

(21) Appl. No.: 09/662,499

(22) Filed: Sep. 14, 2000

Related U.S. Application Data

(63) Continuation-in-part of application No. 09/541,804, filed on Apr. 3, 2000.

(51) Int. Cl.[7] .............................................. G06F 15/16
(52) U.S. Cl. ..................... 709/227; 709/224; 709/228; 707/9
(58) Field of Search ................................ 709/206, 220, 709/222, 224, 228, 230, 227, 232; 705/37; 370/252; 455/4.2; 379/26, 90; 707/9

(56) References Cited

U.S. PATENT DOCUMENTS

| | | | |
|---|---|---|---|
| 5,638,504 A * | 6/1997 | Scott et al. ................. | 715/530 |
| 5,736,982 A | 4/1998 | Suzuki et al. ............... | 345/330 |
| 5,754,939 A * | 5/1998 | Herz et al. .................. | 455/3.04 |
| 6,023,685 A | 2/2000 | Brett et al. .................... | 705/37 |
| 6,057,856 A | 5/2000 | Miyashita et al. .......... | 345/435 |
| 6,064,730 A | 5/2000 | Ginsberg ..................... | 379/265 |
| 6,377,993 B1 * | 4/2002 | Brandt et al. ............... | 709/227 |
| 6,421,653 B1 * | 7/2002 | May ............................ | 705/37 |
| 6,460,036 B1 * | 10/2002 | Herz ............................ | 707/10 |
| 6,496,681 B1 * | 12/2002 | Linton ........................ | 434/350 |
| 6,515,968 B1 * | 2/2003 | Combar et al. ............. | 370/252 |
| 6,564,261 B1 * | 5/2003 | Gudjonsson et al. ....... | 709/227 |
| 6,591,265 B1 * | 7/2003 | Erickson et al. ............... | 707/9 |
| 6,611,498 B1 * | 8/2003 | Baker et al. ................. | 370/252 |
| 6,704,024 B2 * | 3/2004 | Robotham et al. .......... | 345/581 |

FOREIGN PATENT DOCUMENTS

KR   1992-7000435   2/1992   ........... G06F 15/21

OTHER PUBLICATIONS

Thomas Erickson, et al., *Socially Translucent Systems: Social Proxies, Persistent Conversation, and te Design of "Babbie"*, CHI 99, May 15-20, 1999, pp. 72-78.

* cited by examiner

*Primary Examiner*—Khanh Dinh
(74) *Attorney, Agent, or Firm*—F.Chau & Associates, LLC

(57) ABSTRACT

The present invention relates to a method for representing users within an online environment. The method allows users to define environmental parameters for controlling user interaction, define user representation parameters of user data within the environment, capture user data from the users, build an abstract graphical display of the environment, and build a user representation within the abstract graphical display for each user's data.

17 Claims, 10 Drawing Sheets

ONLINE LINE

AUCTION PROXY

AUCTION PROXY

AUCTION PROXY

AUCTION PROXY

METHOD FOR TRANSLUCENT ONLINE INTERACTION

This is a continuation-in-part of the commonly assigned application Ser. No. 09/541,804, filed Apr. 3, 2000, the disclosure of which is incorporated-by-reference in its entirety herein.

BACKGROUND OF THE INVENTION

1. Field of the Invention

The present invention relates to social proxies, and more particularly towards a user-defined social proxy for the graphical representation of physical and online environments.

2. Description of Prior Art

In the area of online user interaction, there are several efforts working towards creating a computer interface capable of displaying intangible qualities typically associated with live interaction. For example, Microsoft's® hierarchical file system interface, Babble, usage summaries for web sites, and The Palace (www.thepalace.com). These systems include elements which relate to attributes normally associated with a physical interaction. For example, by posting the number of visitors to a web site (e.g., usage summaries), a user can have a feeling of belonging to a larger group of people interested in that web site. These and other systems are described below.

FTP allows online users "anonymous"—to have access to a collection of documents; one or more users being authorized to add documents to the collection. No other styles of interaction are definable by the users. (See Ed Krol, *The Whole Internet Catalog*. O'Reilly and Associates, Inc. Sebastopol, Calif. 1992.)

NNTP or network news, provides a venue in which users can asynchronously post messages and responses into administered news groups (i.e., predefined groups of messages which are meant to relate to specified topic, e.g., all articles in alt.sport.soccer should deal with soccer). Only loosely structured forms of interaction are provided, e.g., query-and-respond, which are not then enforced. No other styles of interaction are user definable.

Internet Relay Chat (IRC) is similar to NNTP in that it allows users to post messages and responses in predefined topic areas—called channels in IRC. The main difference with IRC is that the interactions are synchronous rather than asynchronous as in NNTP. Just as with NNTP, IRC does not enable users to define structured forms of interaction which include rules of enforcement.

Loom, a visualization tool for Usenet (NNTP) news groups, provides a technique for displaying the emotional mood (e.g., hostile, happy) of an NNTP-based online community (e.g., a Usenet news group) by analyzing the content of its interactions. Although this utility can analyze online interactions and provide a graphical representation of aspects of the interactions, it does not provide a way for users to define structured styles of interaction. (See Judith Donath et al. "Visualizing Conversation" published in the *Journal of Computer Mediated Conversation*. Volume 4, number 4, June 1999.)

Babble provides dynamic indicators of the presence and activity of all operational users with respect to the available topics (i.e., discussion areas created by the users). These indicators are computed using the activities of the participants (e.g., connections, postings, and topic switches). Although lightly structured styles of interaction are frequently adopted (e.g., interaction in the "—Commons Area—" is informal conversation, while interaction in the "Babble Problems" topic consists of serious question/answer dialogs), no way is provided for users to formally specify structured styles of interaction and then have them enforced. (See Thomas Erickson, et al. "Socially Translucent Systems: Social Proxies, Persistent Conversation, and the Design of 'Babble.'" published in *Human Factors in Computing Systems: The Proceedings of CHI '99*. ACM Press, 1999.)

Online games, like chess and bridge (e.g., Chessmaster 6000 by Mindscape, Inc.), provide structured and enforced styles of interaction, but not ones that (1) can be defined by the users, the rules all being predefined; (2) that can have the rules changed by the users during a game (e.g., "A queen can leap from anywhere to anywhere"); and (3) that include user defined rules of enforcement.

The Palace (www.thepalace.com), is a collection of Internet chat rooms. The site uses a graphical display and user icons. A Palace Site is an online community where users can come together and chat while being represented by a graphical image. There are thousands of existing Palace Sites. Users can connect to The Palace Sites with The Palace Viewer (TPV) or The Palace User Software. Currently, there are eight channels: Welcome, TV, Movies, Music, Romance, Indie, Teens, and International. A channel refers to a specific category of Palace Sites. Inside each channel is a collection of Palace Sites related to that category. TPV allows users to visit Palace Sites through their web browsers. With TPV and The Palace Server, a user can add a Palace community to a web site. The Palace User Software enables a user to connect to all the different Palace Sites located in Palace Space.

Coordinator, a method of structuring human communications, provides an electronic mail-based system that allows users to structure conversations and track tasks. For example, a typical interaction begins with a "Request" message from person A to person B, requesting something from person B by a certain date. This e-mail note asks Person B to respond with a "Promise" message (promising to perform the action), with a "Decline" message (declining to perform the action), or with a "Counteroffer" message (offering to perform the action by a different date or to perform a different action). If B promises to do the action, then a typical conversation might continue with B, eventually sending a "Report completion" message (indicating that the action has been performed) and A replying with a "Close" message (indicating that the action was performed satisfactorily). (See: Flores et al. "Method and Apparatus for Structuring and Managing Human Communications By Explicitly Defining the Types of Communications Permitted Between Participants." U.S. Pat. No. 5,208,748, May, 4, 1993.)

The Oval implementation of Coordinator extends the base functionality by allowing end-users to modify interaction rules mid interaction (see Malone et al. "Experiments with Oval: A Radically Tailorable Tool for Cooperative Work" via URL http://ccs.mit.edu/papers/CCSWP1181/index.html#4b).

Thus Coordinator, implemented with Oval allows users to define and maintain structured styles of online interaction. Users are still unable to (1) provide rules of enforcement; (2) switch from one user-defined genre to another during a given interaction (e.g., reassign the roles of the participants); and (3) handle interactions where messages are posted to a group of recipients, all of whom are not known a priori (e.g., as is the case in an online lecture where the speaker broadcasts his speech to whomever is listening). Also, Coordinator/Oval allows users to specify rules specifying the graphical/iconic representation of the state of their conversations, initial, as well as the for the effect of rule violations (e.g., a particular change in the color of interrupter's icon).

Therefore, a need exists for a method of representing physical and virtual environments, including user profiles, in a user-defined structured graphical form, wherein variables are dynamically updated.

SUMMARY OF THE INVENTION

The present invention is directed to a method for representing users within an online environment. Environmental parameters are defined for controlling user interaction. Further, user representation parameters of user data are defined within the environment, user data is captured from the users, an abstract graphical display of the environment and a user representation within the abstract graphical display for each user's data is built.

Defining environmental parameters is preferably user controlled and includes determining the environmental structure, determining desired user parameters within the environment, and governing user interaction within the environment according to the user parameters and the environmental structure. The environmental structure can be an auction, a queue of users, a chat room, a conference room, a news group, an online help desk, and a business interface.

The method defines user representations based on user profiles. User data is preferably captured from a user's device registered with a social proxy providing service. In another embodiment, user data is captured from a user's activity within the environment. According to yet another embodiment, user data is updated periodically.

The method allows the user to navigate the abstract graphical display by selecting an object to reveal information or data about the object. An object can be an element represented in the abstract graphical display, including the abstract graphical display. The information can be a hierarchical relationship, content of a compound data object, a zoomed view, and/or user information.

In another embodiment, the method of representing a social proxy in an abstract graphical display includes defining the social proxy for a virtual environment and facilitating user interaction, defining a user proxy for a user, the user proxy having updatable variables, displaying the user proxy within abstract graphical display of the social proxy, and updating user proxy variables periodically. The social proxy can be defined by a provider. In one embodiment of the present invention, a proxy is defined for a provider, and displayed within the social proxy. The provider can be the user.

In yet another embodiment the method displays a link to a second social proxy. The social proxy includes other social proxies within a hierarchical system of proxies. The social proxy is preferably used interactively by the user with an application, the application is an extension of the social proxy.

Usage of the invention can be limited in terms of available data based on a user's access credentials.

In another embodiment of the present invention, a computer-based medium is disclosed. The computer-based medium includes stored programs, readable by a computer, for causing the computer to present an environment in graphical form the computer includes a processor for receiving information from a plurality of users and presenting the information in a graphical form to the users. The environment can be a physical environment, a virtual environment, or a combined physical and virtual environment. The users can communicate user data to the processor for incorporation in the graphical environment as user proxies.

BRIEF DESCRIPTION OF THE DRAWINGS

Preferred embodiments of the present invention will be described below in more detail, with reference to the accompanying drawings.

DETAILED DESCRIPTION OF PREFERRED EMBODIMENTS

Figure 1:
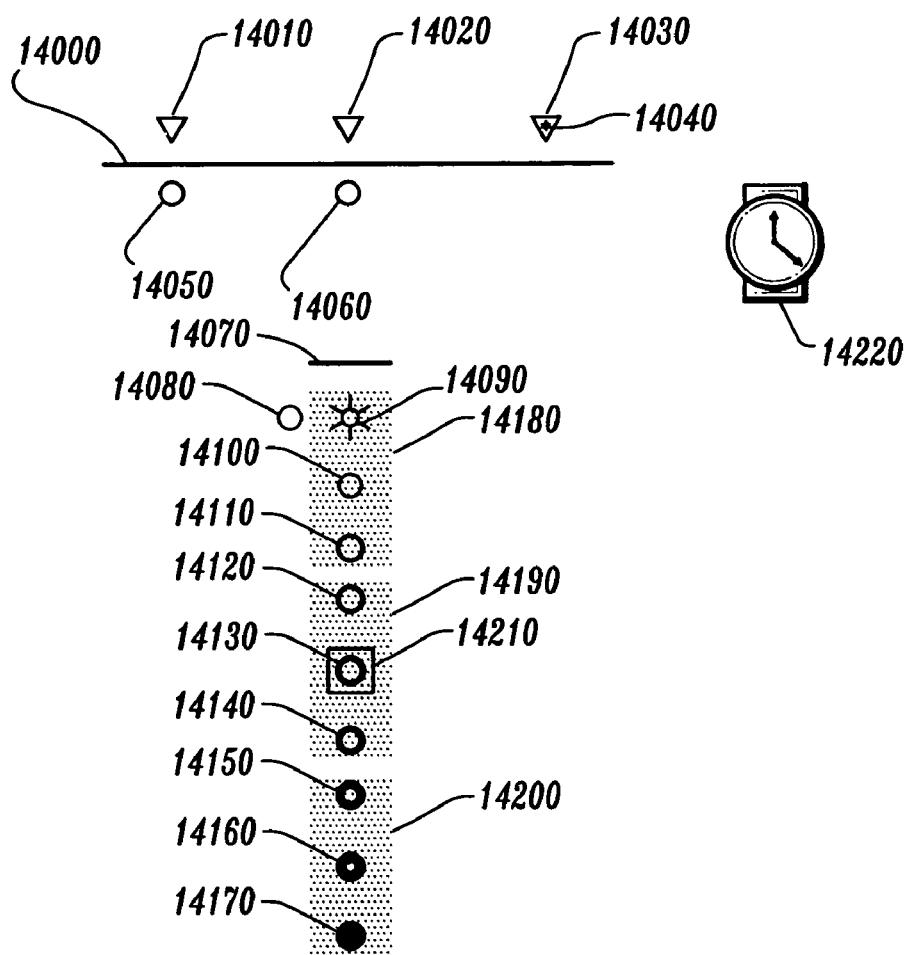
FIG. 1 shows a graphical representation of an online line.

The present invention is directed towards a system and method for generating graphical representations of online interactions, for example, Internet chat rooms, a group of customers, clients seeking customer support, online auctions, etc. Through the dynamic visual presentation of these interactions, the present invention enhances distributed communities by fostering user interaction through the dissemination of information.

The abstract graphical representation of an environment is called a social proxy. A social proxy can show presence of users and objects in a physical or virtual space. Further, a social proxy can provide indications of activity, including degree of activity, and activity with respect to others and/or shared resources. One embodiment of the present invention relates to a method of providing user-defined translucent environments having updatable variables. Systems which provide perceptually-based social cues, affording user awareness, are socially translucent systems.

According to an embodiment of the present invention, users register and/or supply profiles to a server. These profiles are available to businesses and users in graphical form and can be updated by the user. Therefore, a profile can contain updatable variables. According to another embodiment of the present invention, users are provided with a device and/or software for sending information to a network. The information can include updated variables. The network can include any distributed scheme of processors. The network can connect, for example, other users and businesses, as well as other computers. The device can include any portable, personal device, preferably one that is wirelessly connected to a network, and includes a graphical display. A service provider monitors the realm of interest, specifically, which users are active, what they are doing, and how they are doing it. The realm of interest can be any topic, subject, etc., covered by the service provider in the form of an environment supporting social proxies.

In one embodiment of the present invention user information is periodically updated, this can be automatic. The information, or variable user data, can include, among other things, the amount of time a user has been in a social proxy, the degree of participation or interaction, the perceived state of mind (discussed below), the number of users represented by a single user representation, and the physical location of a user. Those skilled in the art would recognize, in light of the present disclosure, that other information can be implemented and updated. Accordingly, the invention can provide up-to-date, dynamic information of current interactions and market conditions. Alternatively, user information can be updated upon the happening of an event, such as a purchase, downloading a software patch, or delivery of a product to a business. In yet another embodiment, user information is updated upon the periodic connectivity of the user's device, for example, a personal digital assistant (PDA) and an associated synchronization procedure with a personal computer (PC).

Time is another contemplated element of the present invention. For example, in the context of an online auction, the time remaining in the auction can be included in the graphical representation of an environment. In business applications, time may be presented in numerous instances, for example, estimated waits, shipping time between various zones, and priority messaging.

In still another embodiment of the present invention, social interactions can be made increasingly vibrate through the use of visual indicators. For example, one who demonstrates composure can be represented in a "cool" color such as blue, while a participant who demonstrates abashed rhetoric can be represented in red. These determinations can be made using, for example, Dynamic Behavior-Sensitive Access Control, application Ser. No. 09/542,481, filed Apr. 3, 2000. The Dynamic Behavior-Sensitive Access Control system assigns an entity a default authorization meta-tag, monitors the entity's behavior, and updates the entity's meta-tag based upon the observed behavior. The authorization meta-tag is multidimensional. Further, the meta-tag can be embodied in a PICS label. Alternatively, other methods can be used to indicate a user's perceived state of mind, such as, size, shape, and pattern.

In addition to individual characteristics, groups of user proxies can represent particular conversations based on relative proximity of multiple user proxies to one another. For example, a group of three proxies touching one another can represent an active conversation between those three within the sphere of a particular topic. When used in a broader context, an entire range of topics can be displayed as separate and/or overlapping shapes, for example, circles, each capable of having participants within. And within each circle the types of representations and interactions discussed above.

In other social contexts, for example an auction, levels of activity can be displayed as different areas. For example, consider two circles, one smaller circle within a larger circle, the participant proxies within the outer circle can represent those who are merely observing the activity surrounding a particular good or service being auctioned. The inner circle can include those who have actively bid. In addition, other parameters can be presented, for example, the length of time a particular participant has spent observing or bidding. Such a parameter can be represented by proximity to the center of the graphical representation.

A preferred embodiment of the present invention will now be discussed with respect to FIG. 1. FIG. 1 depicts a graphical representation of an online line, i.e., a queue of online users of a given service, who are all waiting to be served. Currently, for call-in services, one is either given some indication of how long their wait will be, or simply assured that they will be served in the order in which they called.

As shown in FIG. 1, the separator between servers and consumers (users) is represented by a line (14000), with the service providers represented by the geometric shapes (14010, 14020, and 14030) located above the line. Service providers who have just become available are indicated with an asterisk (14040). Those with ordinary skill in the art will appreciate, in light of the present disclosure, that there are many other ways to represent the service providers, as well as those providers that have just become available, including but not limited to the use of different colors and sizes. Dots (14050 and 14060) just below the line (14000) represent those customers that are being served. In a preferred embodiment of the present invention each dot (14050 and 14060) can have a time indicator associated with it, for example, displaying the amount of time the given user has spent with a service provider. The time indicator can be embodied in, for example, a flyout box displayed when a user positions a mouse cursor over a given dot, a permanent analog representation, etc. This can allow those waiting to identify customers that appear to be holding up the line (i.e., taking too long).

Returning to FIG. 1, line 14070 indicates the head of the line, with dots 14080, 14100 through 14170, and star 14090 representing customers waiting in line. The square (14210) surrounding dot 14130 indicates the particular user who is currently both waiting in the line and viewing the proxy. Shaded areas 14180, 14190, and 14200 represent sets of users with approximately the same estimated wait. A given user of the interface can retrieve this estimation by moving their mouse cursor over the area of interest and dwelling there momentarily; a pop-up box will appear with the estimated wait time for the corresponding section. Note that the estimated wait time could also simply be listed to the side of the given section. The clock (14220) displays the estimated wait time for the given current user (e.g., the user represented by dot 14130, the dot that is surrounded by square 14210).

The usual progression of this representation is that as a service provider (one of triangles 14010–14030) becomes free, the next dot (14080, 14100–14170), or star (14090) located below line 14070, moves to the space just below line 14000 below the open customer provider (star shapes switching back to dots after the move).

Dot 14080 is located to the left of top section 14180 and there is a star (14090) just to its right, a star located with section 14180. This arrangement indicates that the user represented by dot 14080, let the user represented by star 14090 takes its place in line. Once 14090 is served and 14090 is removed from the queue, dot 14080 moves right into the place previously occupied by 14090.

Also note that the thickness of the edges of the dots (14080, and 14100–14170) increases the further back in line the given dot is located. This edge thickness indicates the increasing length of the estimated wait for the associated user.

Those with ordinary skilled in the art will appreciate, in light of the present disclosure, that by selecting a particular customer dot, for example, 14110, viewers of this online line can retrieve information about the given customer. This information can include, for example, user name and e-mail address. Similarly, by selecting the triangle of one of the service providers (14010–14030), a user can retrieve information about the associated service provider, for example, their average response time and their average number of successful transactions.

The present invention contemplates a key for providing a list of the estimated wait for each edge thickness shown. Further, other features can be used to represent user information, for example, color, intensity and/or dot size.

In addition to revealing user information and profiles, the present invention can present information relating to sellers and business. For example, the social proxy concept is applied to customer support representatives. Now a business can visualize the current customer to representative ratio and adjust service accordingly, for example, shifting man power from sales to support services. Further, solutions presented to one customer can be made available to other customers waiting to be served. Therefore, a customer waiting in line can have his or her issue resolved without the need for personal customer support interaction.

Figure 2:
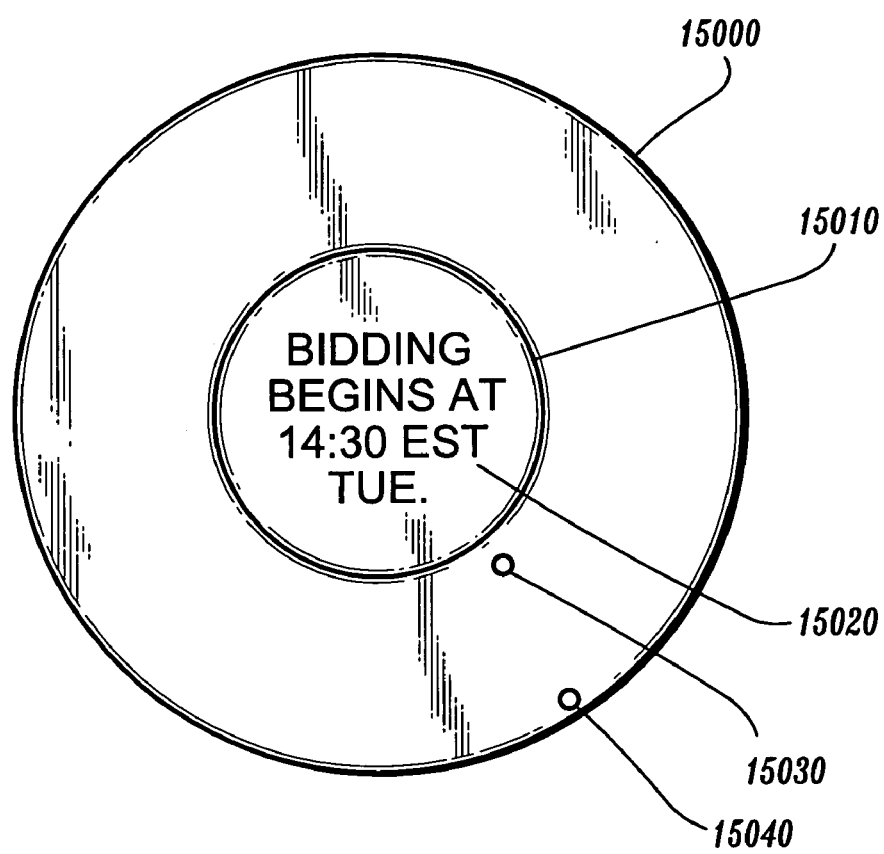
FIG. 2 shows a graphical representation of an auction.

FIGS. 2 through 5 show an example of a graphical representation of an activity proxy for an online auction. In FIG. 2, the outside circle (15000) represents a particular auction. An auction can involve, for example, automobiles and service contracts. The dots (15040 and 15030) located between circle 15000 and concentric circle 15010 represent users who have requested information regarding this auction. Each dot's radial distance from the center represents how recently respective requests were made. Thus, as shown, dot 15030's user has requested information more recently than dot 15040's user. The area within the circle 15010 indicates when the auction will begin, e.g., "Bidding begins at 14:30 EST TUE" (15020).

Figure 3:
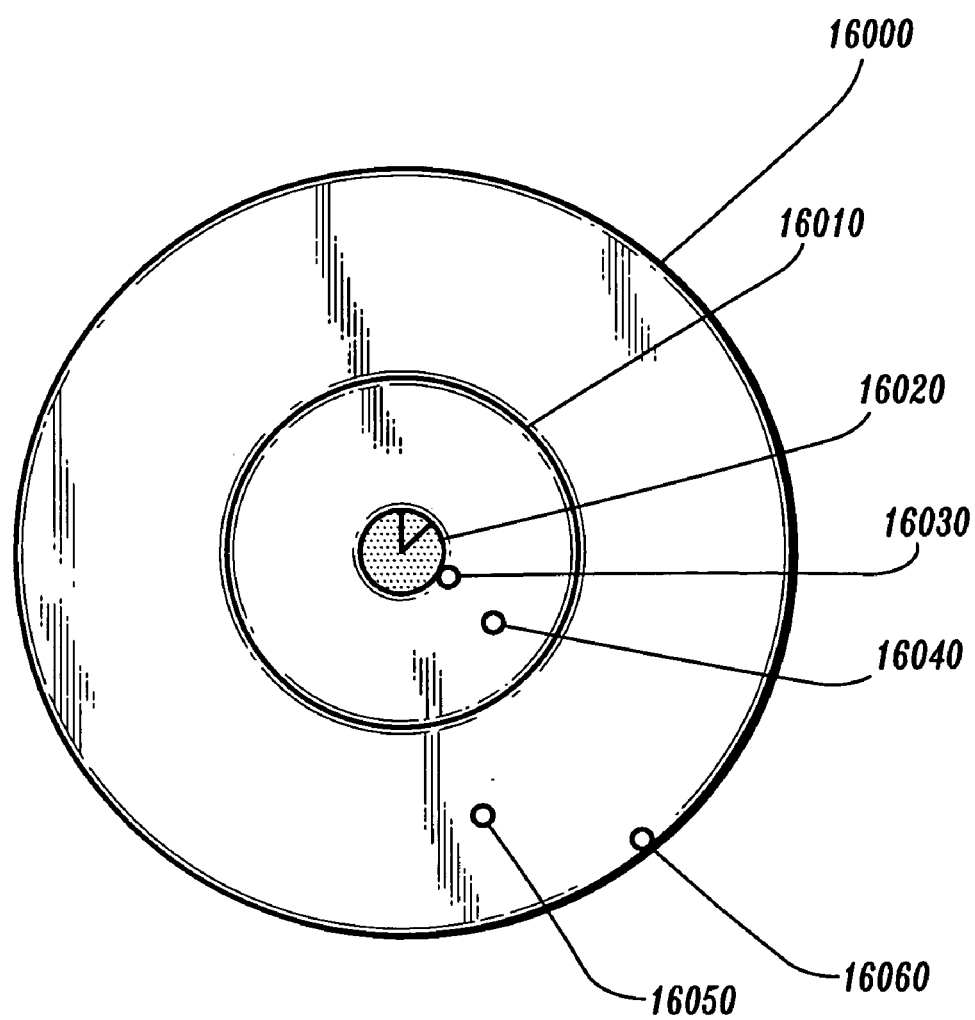
FIG. 3 shows another graphical representation of an auction.

FIG. 3 represents the same auction as FIG. 2 except that here the auction has already begun. Here too, the area between the outer circle (16000) and the inner circle (16010) contains dots (16050 and 16060) representing users who have requested information about the given auction. Dots (16030 and 16040) located between the inner circle (16010) and in the innermost clock graphical (16020) represent users who have actually placed a bid. Here again, the dots' (16030 and 16040) radial distance from the center indicates who placed the most recent bid. Thus, as shown, the user represented by dot 16030 has placed a his/her bid more recently than the user represented by dot 16040. The clock graphical (16020) in the center indicates the amount of time remaining in the auction: as shown, approximately one sixth of the allotted time has already passed.

Figure 4:
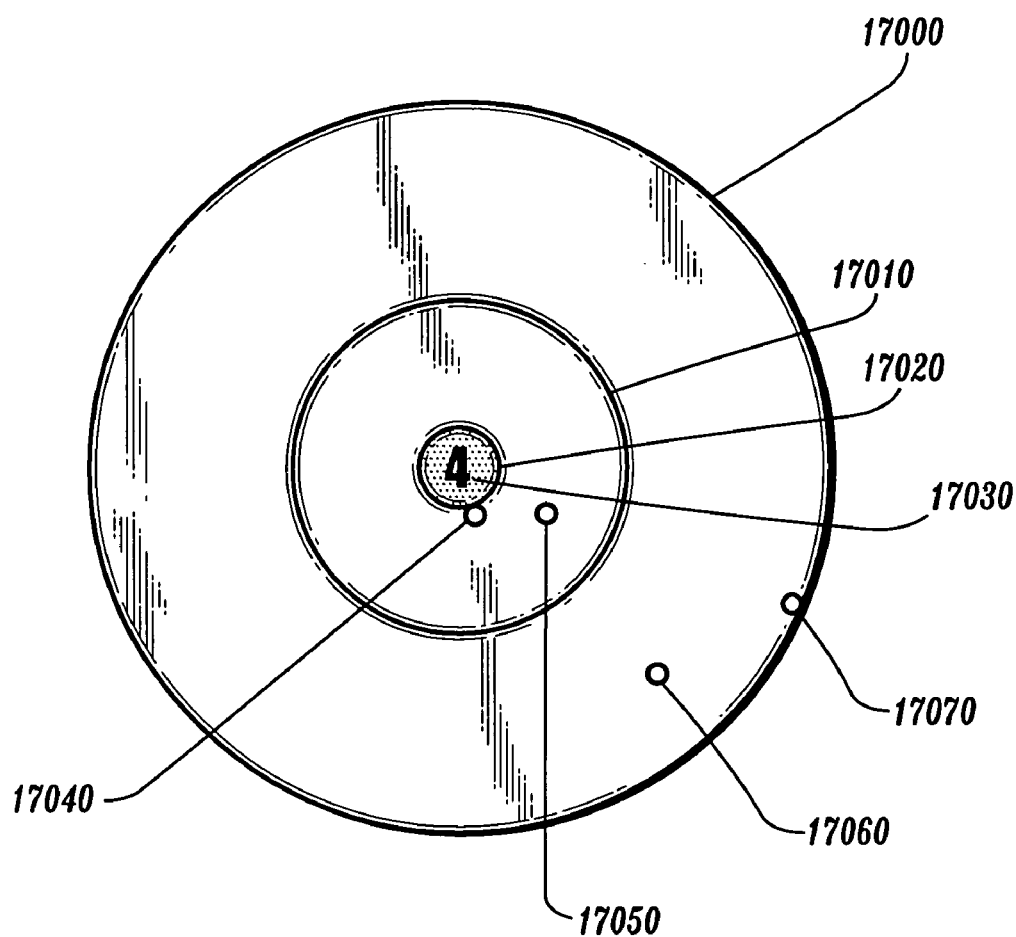
FIG. 4 shows still another graphical representation of an auction.

FIG. 4 represents the same as FIGS. 2 and 3 excepts that here the auction is nearly over: there are only 4 seconds left to bid. This is indicated by the number (17030) located within the innermost circle (17020). Just as in FIG. 3, the bidders are represented by the dots 17040 and 17050 located between the innermost circle 17020 and the inner circle 17010, and the information seekers, represented by dots 17060 and 17070, located in the area between inner circle 17010 and outer circle 17000. The time lapse since a user's bid and/or information request can be indicated by the radial distance from the center.

Figure 5:
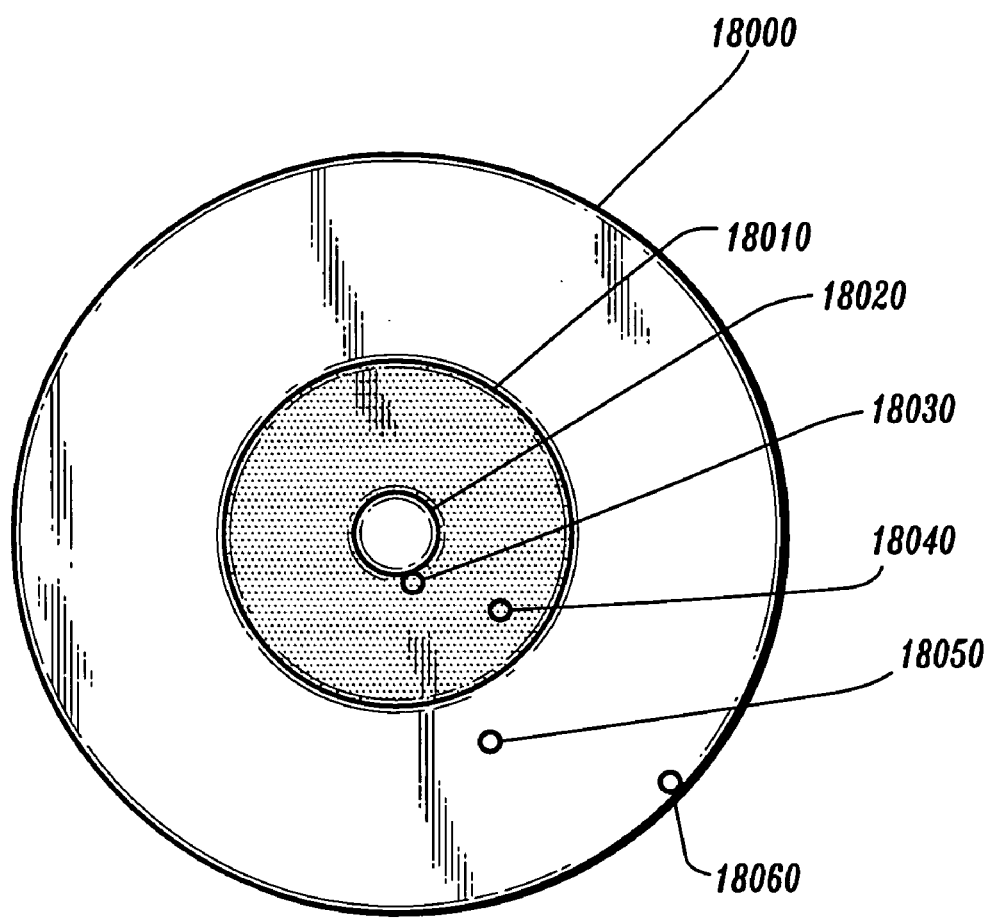
FIG. 5 shows a graphical representation of an auction.

FIG. 5 depicts the auction after the bidding is closed. This is indicated both by the facts that the area within the innermost circle (18020) is no longer shaded, and by the fact that the area between the innermost circle (18020) and the inner circle (18010) is shaded. Dots 18030 and 18040, located in this shaded region, represent the two winning bidders (assuming two instances were auctioned off together). Dots 18050 and 18060 represent users who have recently requested information, 18050's user more recently than 18060's.

Those will ordinary skill in the art will appreciate, in light of the present disclosure, that even though the dots within the shaded region (between 18010 and 18020) will not change with time, since the bidding is already over, the number and relation of the dots between circles 18000 and 18010 can continue to change for as long as the auction's representation is made available for viewing.

Further, by selecting particular dots (e.g., by moving the cursor over the given dot and then clicking the right mouse button) viewers of this auction proxy can retrieve information regarding the associated user (e.g., the user's name, how often the have bid, how often they won, how often they have actually paid off their bid, what else they have bought, etc.).

In addition, each user-represented dot can be uniquely colored or textured for example. The central circle 18020 can also be colored the same as that of the winner, or in cases where there are several winners, the central circle (18030) can be sliced into wedges, and each wedge colored to match a winner's dots.

In one embodiment of the present invention the sequence of auction proxies for a given auction can be recorded. A recording can, for example, memorialize the auction proxy for a given auction every two seconds. This enables later replay of the auction. Such a replay can be user, for example, to train future users, or to analyze the buyers actions.

In yet another embodiment of the present invention, the method reveals market conditions to market participants. The representation can reveal the market direction more accurately by revealing, for example, the number or participants and each participants size or buying power. Distinguish the current art which uses bar and line graphs to present past market fluctuations with the present invention allowing users to judge the market based on perceived entrants before transactions are made. Participants can judge the degree of interest in a particular commodity and trade accordingly. In addition, several smaller buyers can band together to receive discounted rates from sellers.

Figure 6:
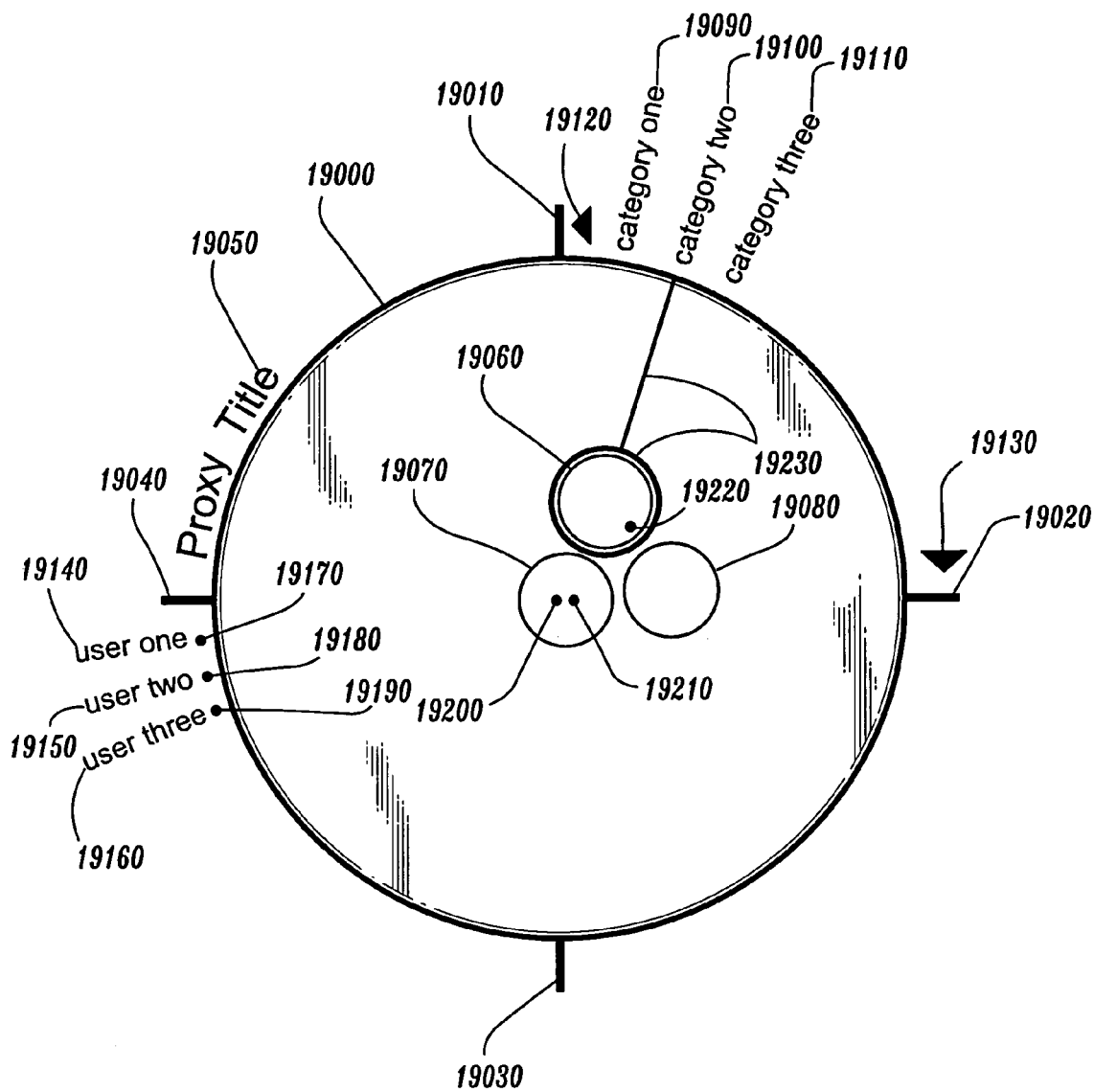
FIG. 6 shows a graphical representation of a social proxy.
Figure 7:
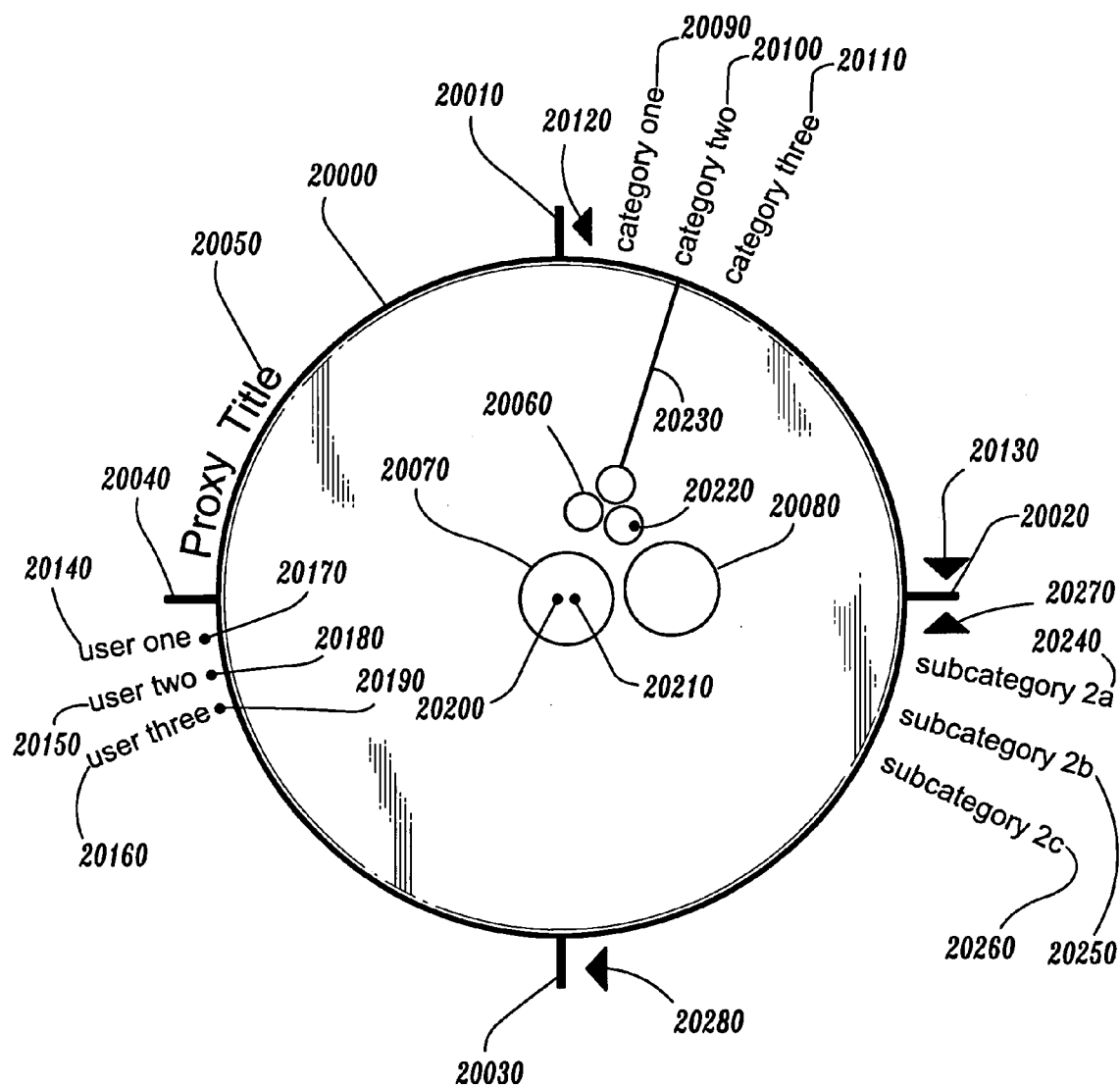
FIG. 7 shows another graphical representation of a social proxy.
Figure 8:
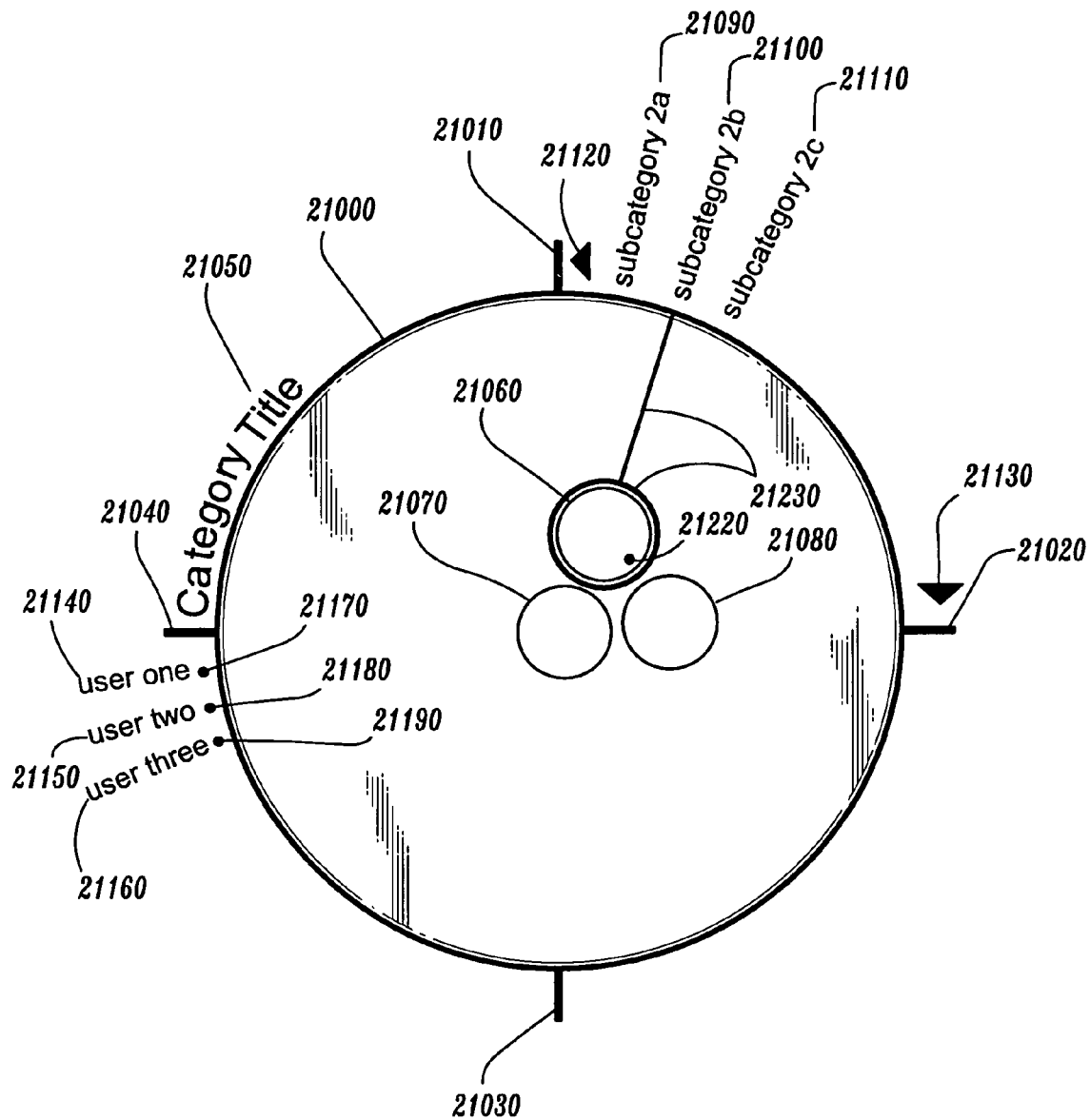
FIG. 8 shows yet another graphical representation of a social proxy.
Figure 9:
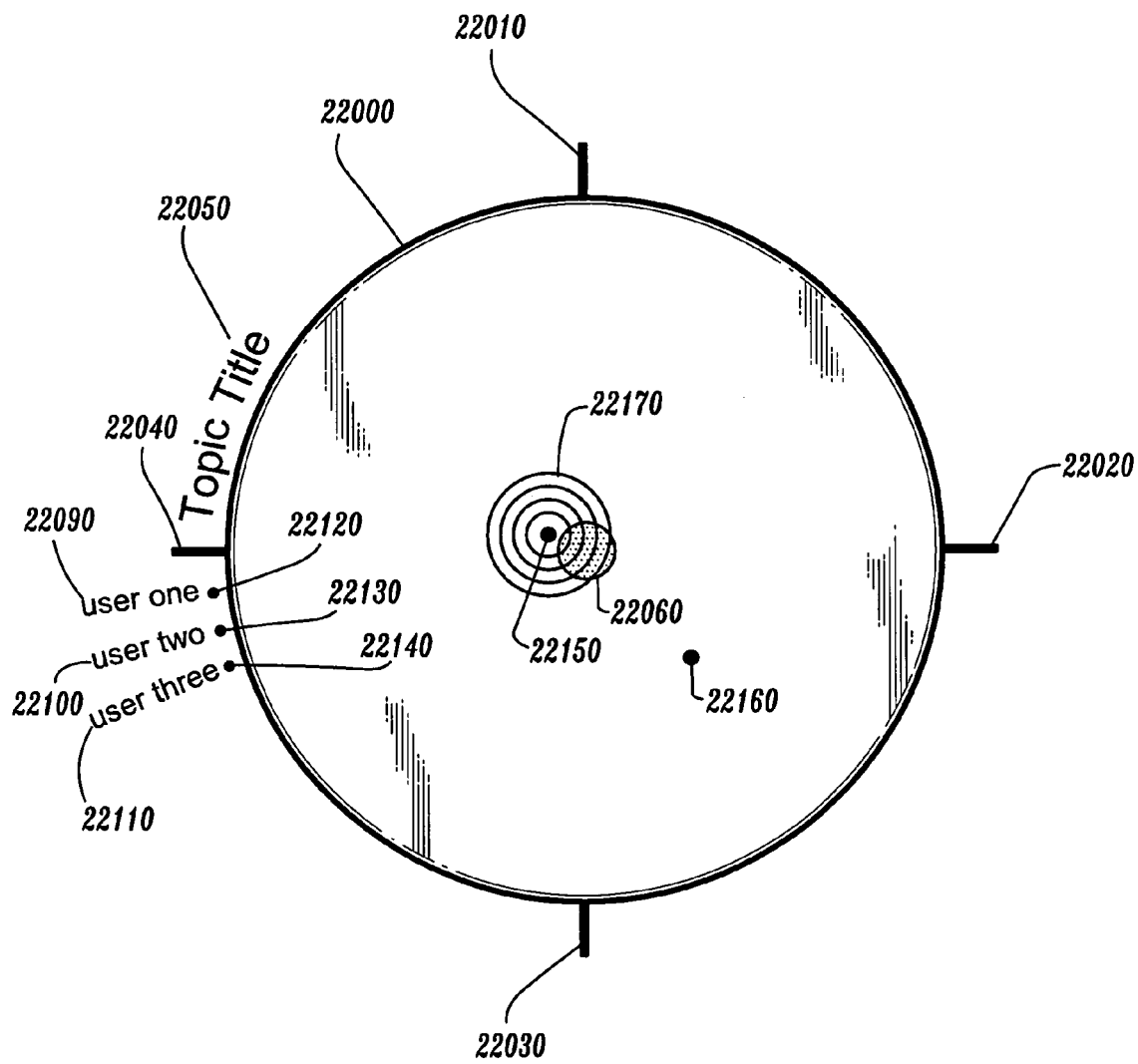
FIG. 9 shows a graphical representation of a social proxy having one user actively posting.
Figure 10:
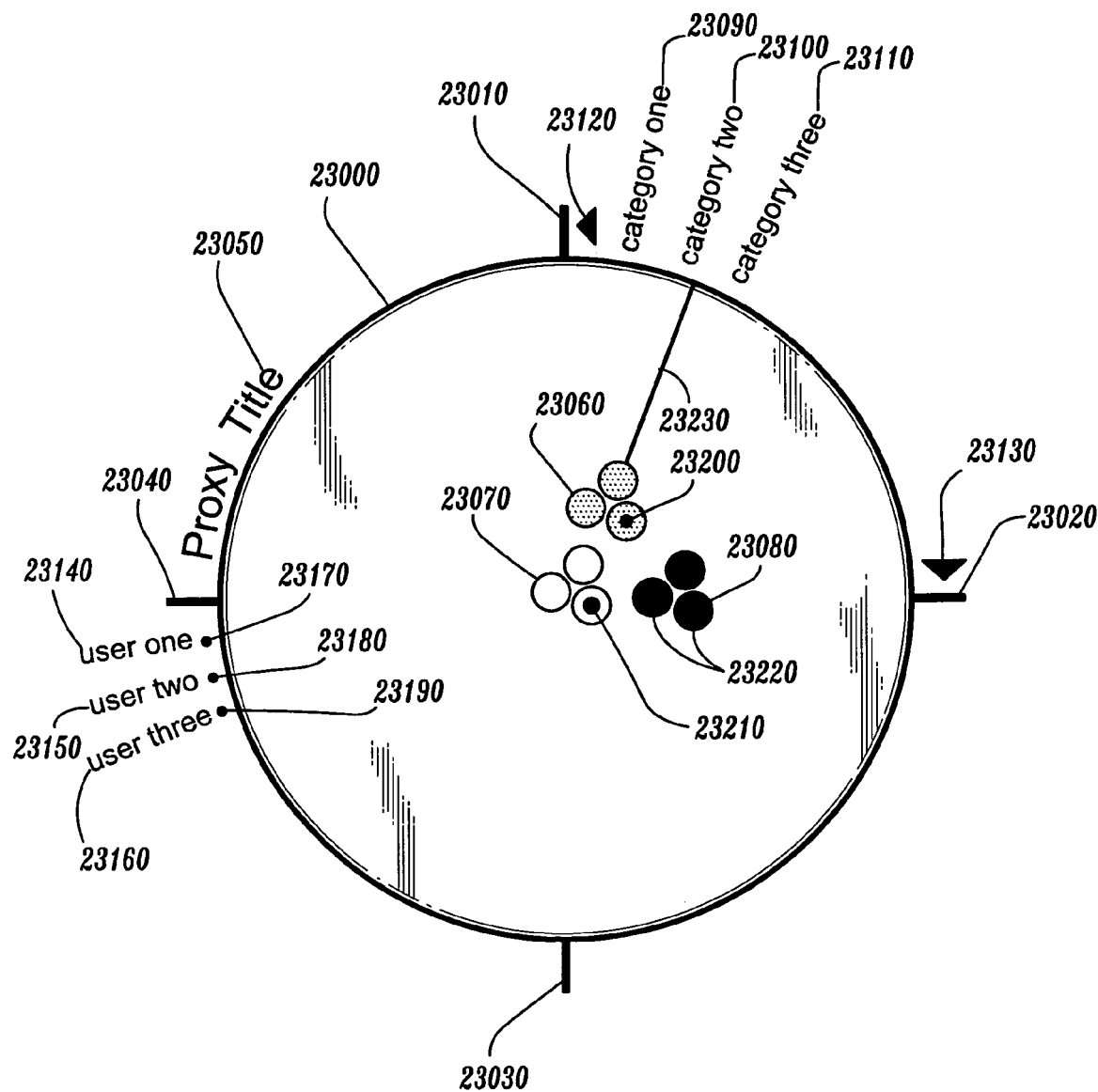
FIG. 10 shows still another graphical representation of a social proxy.

FIGS. 6 through 10 depict a graphical representation of a social proxy in which online collaboration and social awareness are displayed. More specifically, this collaboration space is an online discussion environment in which one or more users post messages to each other within one or more discussion categories. FIGS. 6 and 7 depict the highest level and overall organization of the collaboration. FIGS. 8 and 9 exhibit lower (and more specific) levels of discussion. FIG. 10 depicts a graphical representation of activity levels within the collaboration space over time.

As shown in FIG. 6, circle 19000 is the fundamental boundary of the social proxy, delimited in quarters by lines 19010 through 19040. External to the circle, the quadrant between lines 19040 and 19010 is reserved for the title of the social environment (19050). The quadrant between lines 19040 and 19030 is an index of users currently logged on the system: labels 19140 through 19160 are user names, and dots 19170 through 19190 are colored user marbles specifically associated with each user label respectively. The quadrant between lines 19010 and 19020 is reserved for an indexical and navigational field of discussion topics. This area includes labels for each category (19090 through 19110), creating a category list. This area can also include arrows (19120 and 19130) with which to scroll the category list in cases where the list exhausts the available space. Selecting arrow 19120 causes the list to scroll counterclockwise, while selecting arrow 19130 causes the list to scroll clockwise, thereby accommodating an extensive list of categories. Those skilled in the art will appreciate similar scrolling application to an extensive list of user names and dots.

Every category label (19090 through 19110) has a corresponding circle (19060 through 19080) inclusive within circle 19000. When a category discussion is added to the online environment, a corresponding category discussion is deleted, the corresponding category circle and category label is deleted from the representation. The ability to add or delete discussion categories and their corresponding circles provides a customizable social proxy specific to the user community.

Colored user dots (19170 through 19190) located outside circle 1900 also have a corresponding user dot within category circles (19200 through 19220) to signify where the associated user is active. Both types of user dots (e.g., 19170 and 19200) appear when the user logs on the system and disappears when user leaves. The emergence and disappearance of user dots provides a dynamic environment infused with social awareness within the online community.

As the user moves the mouse cursor over a given category circle (e.g., 19060), a new circle (19230) wraps around that circle (e.g., 19060) and a line (19230) is drawn to the corresponding category label (e.g., 19100). Similarly, as the user moves the mouse cursor over a given category label (e.g., 19100), the same circle and line (19230) wraps around the corresponding category circle (e.g., 19060). Likewise, a mouse cursor over a user dot (e.g., 19200) will cause a circle and line similar to 19230 to appear; the circle surrounding dot 19200 and the line extending from there to the corresponding indexical user dot (e.g., 19170).

FIG. 7 embodies the same elements of FIG. 6: overall proxy circle (20000), divided quadrants (lines 20010 through 20040), proxy name (20050), user labels (20140 through 20160), user index dots (20170 through 20190), category labels (20090 through 20110), scrolling arrows (20120 and 20020), inner category circles (20070 and 20080), and inner user dots (20200 through 20220). Their representations and function remain consistent with respective elements in FIG. 6.

As the user selects a category label (e.g., 20100), an array of subcategory labels appears between lines 20020 and 20230, along with scrolling capability associated with arrows 20270 and 20280. In the event that the subcategory list exhausts the available space, arrow 20270 causes the list to scroll counterclockwise, while arrow 20280 causes the list to scroll clockwise, thereby accommodating an extensive list of subcategories.

As the user moves the mouse cursor over a category circle (e.g., 19060), a cluster of smaller circles appears (20060) revealing the nested subcategories within that category label. A click on a category cluster (e.g., 20060) navigates the user to its respective category proxy (see FIG. 8) and allows navigation into nested levels of subcategories.

FIG. 8 depicts a graphical representation of nested levels within a category of social online discussion. The representation embodies the same elements of FIG. 7: overall proxy circle (21000), divided quadrants (lines 21010 through 21040), category name (21050), user labels (21140 through 21160), user index dots (21170 through 21190), category labels (21090 through 21110), scrolling arrows (21120 and 21130), inner category circles (21060 through 21080), and inner user dot(s) (21200) who happened to be participating within a discussion in that category. Furthermore, a mouse cursor over any subcategory circle (e.g., 21060) causes a circle (21230) to surround that subcategory circle and a line (21230) to be extended to the corresponding subcategory label (e.g., 21100). The aforementioned representations and functions remain consistent with respective elements in FIG. 7. In addition, selecting a category circle (e.g., 21060) navigates the user into the specific discussion nested within the subcategory (see FIG. 9).

FIG. 9 depicts a graphical representation of a social proxy in which online collaboration and social awareness are displayed. More specifically, this online discussion environment provides user presence and group awareness.

The representation embodies the same fundamental elements as FIG. 8: social proxy circle (22000), divided quadrants (lines 22010 through 22040), and topic name (22050). Likewise, user labels (22090 through 22110) and user index dots (22120 through 22140) represent an index of users currently logged on the system.

Shaded circular region 22060 is located in the center of the social proxy circle (22000) and becomes the area around which user dots (22150 and 22160) congregate. When a user is active (e.g., posting a message or actively scrolling within the window), the user's dot (e.g., 22150) remains closest to the central region (22060). When a period of time elapses without user participation, the dot (e.g., 22160) moves to the periphery of the social proxy (22000). When a user posts a message, a graphical representation (e.g., 22170) of that posting becomes associated with the user dot (e.g., 22150). Those skilled in the art appreciate the possibilities for graphical annotation of a posting made by a specific user; in this case, the graphical representation is radiating concentric rings (e.g., 22170) emanating from the user dot (e.g., 22150).

FIG. 10 depicts a graphical representation of activity levels within the online collaborative environment. FIG. 10 embodies the same elements as FIG. 6: overall proxy circles (23000), divided quadrants (lines 23010 through 23040), proxy name (23050), user labels (23140 through 23160), user index dots (23170 through 23190), category labels (23090 through 23110). These representation and functions remain consistent with respective elements in FIG. 6, with exception of the category clusters (23060 through 23080) which remain simultaneously displayed in lieu of the category circles (19060 through 19080 respectively). As the user mouses over a category cluster (e.g., 23060) or its category label (e.g., 23100), a line (23230) matches it up with its associated circle or label.

Category clusters are arrayed to expose activity levels associated with each topic. Those skilled in the art will appreciate the possibilities for graphical notation of activity levels (e.g., relative brightness, thickness of border, color, shade, size, etc.). FIG. 10 denotes activity levels by degree with which each cluster circle is filled in. No fill within the cluster circle denotes little or no activity. A small fill (e.g., 23200) indicates a small amount of activity within a given time frame. A medium fill (e.g., 23210) indicates moderate activity within a given time frame. A large fill (e.g., 23220) indicates heavy activity within a given time frame. Those skilled in the art can appreciate that a category completely filled can indicate heaviest activity levels within a given time frame. They can also appreciate that the fill areas may take on transparent attributes to allow color to remain apparent. They can also appreciate that these level indicators may indicate other given qualities within the category circle such as length of post, hostility levels, etc.

In another embodiment, business layers may be presented simultaneously, so that for example, a customer may be able to compare the estimated wait time for service between different methods of service (e.g., personal on-line support, telephone support, e-mail requests, and update agents). In addition to the embodiments described above, the present invention contemplates any abstract representation of an environment having social proxies. For example, a three dimensional rendering of a business structure having social proxies in different departments, at different counters, etc.

In addition to graphical representations, the present invention can be combined with other methods, for example, any combination of numbers, symbols, colors, size, shape, images, pattern, vector indicators, depth, weight, height, speed, time, texture, transparency, position, density, etc. In another embodiment, the invention contemplates use with other applications, for example, e-mail, trading and banking software, games, shipping, project progress etc.

In addition to graphical representations, the present invention contemplates other user interfaces. For example, braille characters can be used to allow blind users to access this interface. In one embodiment of the present invention, braille documents can be printed periodically. Other interfaces can include soft braille displays driven by a daemon such as BRLTTY. BRLTTY provides access to a Linux console (text mode) for blind users using a soft braille display, providing complete screen review functionality. In addition to a Braille interface, audio interfaces are also contemplated. For example, Speakup, a screen review package allowing a user to hear all output directed to a console.

Those with ordinary skill in the art will appreciate that what a given user sees in the graphical representation can be limited by user access credentials (e.g., like those provided by Dynamic Behavior-Sensitive Access Control, application Ser. No. 09/542,481 described above). Thus, a user with insufficient access rights would not see category circle 20080 or its corresponding label (20110).

Having described embodiments of a method for translucent online interaction, it is noted that modifications and variation can be made by persons skilled in the art in light of the above teachings. It is therefore to be understood that changes may be made in the particular embodiments of the invention disclosed which are within the scope and spirit of the invention as defined by the appended claims. Having thus described the invention with the details and particularity required by the patent laws, what is claims and desired protected by Letters Patent is set for in the appended claims.

What is claimed is:

1. A computer implemented method for representing a user within an online environment comprising the steps of:
   defining a plurality of environmental parameters for controlling user interaction, the environmental parameters including two-dimensional space parameter and a time parameter, wherein defining, the plurality of environment parameters comprises,
   determining an environmental structure,
   governing user interaction within the environment according to the user parameters and the environmental structure, and
   displaying an abstract graphical cue of a first parameter of the user in the abstract graphical display of the environment, wherein the abstract graphical cue moves through the abstract graphical display of the environment according to a second parameter of the user to provide a second abstract graphic cue;
   defining a plurality of user representation parameters of user data within the environment;
   capturing user data from the user;
   displaying an abstract graphical display of the environment to the user; and
   displaying a user representation within the abstract graphical display incorporating the user data to the user, wherein the user representation appears at a location in the two-dimensional space according to a level of user activity over time.

2. The method of claim 1, wherein the environmental structure is one of an auction, a queue of users, a chat room, a conference room, a news group, an online help desk, and a business interface.

3. The method of claim 1, further comprising the step of defining the user representation based on a user profile.

4. The method of claim 1, wherein the user data is captured from a user's device registered with a social proxy providing service.

5. The method of claim 1, wherein the user data is captured from a user's activity within the online environment, wherein the user data is abstracted to provide the user representation.

6. The method of claim 1, wherein user data is updated periodically.

7. The method of claim 1, wherein the user navigates the abstract graphical display by selecting an object to reveal information about the object.

8. The method of claim 7, wherein the object is an element represented in the abstract graphical display, comprising associated data.

9. The method of claim 7, wherein the information is one of a hierarchical relationship, content of a compound data object, a zoomed view, and user information.

10. A computer implemented method for representing a social proxy comprising the steps of:
    displaying an abstract graphical display of the social proxy for a virtual environment and facilitating user interaction, wherein the social proxy is a geometric shape defining a boundary of the virtual environment, wherein the social proxy for the virtual environment includes a two-dimensional space parameter and a time parameter,
    wherein displaying the abstract graphical display of the social proxy for a virtual environment comprises,
    determining the geometric shape,
    governing user interaction within the social proxy according to the geometric shape, and
    displaying an abstract graphical cue of a first parameter of the user in the abstract graphical display of the social proxy for a virtual environment, wherein the abstract graphical cue moves through the abstract graphical display of the social proxy for a virtual environment according to a second parameter of the user to provide a second abstract graphical cue;
    defining a user proxy for a user, the user proxy having updatable variables;
    displaying the user proxy within the geometric shape defining the boundary of the virtual environment, wherein the user proxy appears at a location in the two-dimensional space according to a level of user activity over time; and
    updating user proxy variables periodically.

11. The method of claim 10, wherein the social proxy is defined by a provider and the user proxy is defined by an abstraction of the updatable variables.

12. The method of claim 10, further comprises the steps of:
    defining a proxy for a provider; and
    displaying the provider within the social proxy.

13. The method of claim 11, wherein the provider is the user.

14. The method of claim 10, further includes the step of displaying a link to a second social proxy.

15. The method of claim 10, wherein the social proxy is one of a plurality of social proxies within a hierarchical system of proxies.

16. The method of claim 10, wherein the social proxy is used interactively by the user with an application, the application is an extension of the social proxy.

17. The method of claim 10, further comprising displaying a portion of the abstract graphical display of the social proxy based on a user's access credentials.

* * * * *